(12) United States Patent
Lee et al.

(10) Patent No.: US 8,805,126 B2
(45) Date of Patent: Aug. 12, 2014

(54) PHOTONIC MODULATOR WITH FORWARD-AND REVERSE-BIASED DIODES FOR SEPARATE TUNING AND MODULATING ELEMENTS

(75) Inventors: Benjamin G. Lee, New York, NY (US); Jeffrey A. Kash, Pleasantville, NY (US); Alexander V. Rylyakov, Mount Kisco, NY (US); Clint L. Schow, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 48 days.

(21) Appl. No.: 13/588,871

(22) Filed: Aug. 17, 2012

(65) Prior Publication Data

US 2014/0050436 A1 Feb. 20, 2014

(51) Int. Cl.
G02F 1/225 (2006.01)
(52) U.S. Cl.
USPC .................................................. 385/2; 385/3
(58) Field of Classification Search
None
See application file for complete search history.

(56) References Cited

U.S. PATENT DOCUMENTS

| 6,081,631 | A | 6/2000 | Brindel et al. | |
|---|---|---|---|---|
| 2002/0179929 | A1* | 12/2002 | Takahashi et al. | 257/184 |
| 2003/0189747 | A1* | 10/2003 | Hayes et al. | 359/241 |
| 2006/0056760 | A1* | 3/2006 | Djordjev et al. | 385/15 |
| 2009/0067852 | A1 | 3/2009 | Sugiyama | |
| 2009/0245713 | A1* | 10/2009 | Doerr | 385/2 |
| 2009/0290831 | A1 | 11/2009 | Green et al. | |
| 2010/0002978 | A1* | 1/2010 | Park et al. | 385/2 |
| 2010/0128336 | A1* | 5/2010 | Witzens et al. | 359/239 |
| 2011/0058765 | A1* | 3/2011 | Xu | 385/2 |
| 2011/0142391 | A1* | 6/2011 | Asghari et al. | 385/2 |
| 2011/0170161 | A1 | 7/2011 | Gill et al. | |
| 2012/0063714 | A1* | 3/2012 | Park et al. | 385/8 |
| 2012/0189026 | A1* | 7/2012 | Binkert et al. | 372/20 |
| 2012/0229886 | A1* | 9/2012 | Chen et al. | 359/326 |
| 2013/0077980 | A1* | 3/2013 | Guo et al. | 398/214 |

FOREIGN PATENT DOCUMENTS

EP 1217425 A1 * 6/2002

OTHER PUBLICATIONS

Huang, A. et al. (Feb. 2006). A 10Gb/s photonic modulator and WDM MUX/DEMUX integrated with electronics in 0.13/spl mu/m SOI CMOS. 2006 IEEE International Solid-State Circuits Conference (ISSCC 2006), Session 13, Optical Communication, 13.7, Digest of Technical Papers., pp. 922-929.

Gu, L. et al. (Jul./Aug. 2008). Physical Mechanism of p-i-n-Diode-Based Photonic Crystal Silicon Electooptic Modulators for Gigahertz Operation. IEEE Journal of Selected Topics in Quantum Electronics, 14(4), pp. 1132-1139.

Chen, X. et al. (Sep. 2007). Silicon Photonic Crystal Modulation Device: Based on Horizontally Activated MOS capacitor. 2007 4$^{th}$ IEEE International Conference on Group IV Photonics, pp. 122-124.

Liao, L. et a., (Dec. 2008). Silicon Photonic Modulator and Integration for High-Speed Applications. IEEE International Electron. Devices Meeting, (IEDM 2008), pp. 1-4.

(Continued)

*Primary Examiner* — Mike Stahl
(74) *Attorney, Agent, or Firm* — Anne V. Dougherty, Esq.; McGinn IP Law Group, PLLC

(57) ABSTRACT

A method and structure for a modulator which includes a forward-biased diode optimized for power and area to perform a tuning function, and a reverse-biased diode optimized for speed to perform a modulation function.

20 Claims, 5 Drawing Sheets

(56) References Cited

OTHER PUBLICATIONS

Spector, S. J. et al. (Jan./Feb. 2010) Operation and optimization of silicon-diode-based optical modulators. IEEE Journal on Selected Topics in Quantum Electronics, 16/1, pp. 165-172. DOI: 10.1109/JSTQE.2009.2027817.

Wei, Yuxin, Zhao, Yong; Li, Guoyi; Yang, Jianyi; Wang, Minghua; Jiang, Xiaoqing (Dec. 2010). Chirp characteristics of silicon March-Zehnder modulators. 2010 Asia Communications and Photonics Conference and DOI: 10.1109/ACP.2010.5682510 (On Order).

* cited by examiner

PHOTONIC MODULATOR WITH FORWARD-AND REVERSE-BIASED DIODES FOR SEPARATE TUNING AND MODULATING ELEMENTS

BACKGROUND OF THE INVENTION

1. Field of the Invention

The present invention generally relates to photonic amplitude modulators. In particular, a photonic modulator having separate diodes for tuning and modulating functions.

2. Description of the Related Art

Photonic amplitude modulators based on interferometric or resonant waveguide structures modulate light by introducing a change in the effective index of refraction, which provides a shift in the optical phase of a lightwave passing through the modulator. This index change is often accomplished by implementing a phase shifter diode across the waveguide and operating the diode in either the forward-biased or reverse-biased condition. In the forward-biased condition, the diode injects a comparatively large amount of current at low voltage, inducing a large index shift for a given length of waveguide. This means that the phase shifter diode can be made using a relatively short length of waveguide. However, the inherently large charge density within the diode results in lower speed performance.

Alternatively, in the reverse-biased state, only small leakage currents flow through the diode, and the electric field primarily induces the change in index. As a result, the diode may operate much faster under this condition, but because the index shift per unit waveguide length is smaller than in the forward-biased region, either a longer waveguide or a much larger voltage is required to generate the needed phase shift. In practice, longer waveguides and much larger voltages are applied to reverse-biased diodes compared to their forward-biased counterparts.

Consequently, a trade-off between power, speed, and area exists when choosing a forward-biased or reverse-biased diode design. A forward-biased diode may be optimized for area by making the waveguide short and operating the diode at increased voltage and current values in order to generate a larger index shift per unit waveguide length. Alternately, a forward-biased diode may be optimized for power by making the waveguide somewhat longer and operating the diode at reduced voltage and current values generating a smaller index shift per unit waveguide length, which accumulates over a longer length of waveguide. Finally, a forward-biased diode may be designed to implement a compromise between power and area by choosing a waveguide length somewhere in between the power-optimized and area-optimized design points.

A Mach-Zehnder interferometer (MZI) is often used to modulate light waves to transmit data. The Mach-Zehnder interferometer uses interference to transform the aforementioned phase modulation into amplitude modulation. Normally both arms of the Mach-Zehnder interferometer are made the same length, so that, by changing the index of refraction in one of the arms, light can be amplitude modulated at the output. Because matching the precise lengths of waveguide between the two arms corresponding to the appropriate fraction of one wavelength of light is very challenging and is often sensitive to temperature variation, a low speed phase tuning element is commonly required within one arm of the Mach-Zehnder interferometer, providing a static adjustment of the index of refraction to tune the bias point of the modulator.

This tuning can be performed, among other ways, through the use of the aforementioned phase shifter diode by applying to it an appropriate tuning voltage in tandem with the AC modulation voltage. Since the semiconductor's thermal response time is orders of magnitude slower than its electronic response time, the tuning can be performed using essentially a DC voltage where feedback from the modulator's optical output is used to control the amplitude of this DC tuning voltage.

Conventionally, there will be a diode in one arm of the Mach-Zehnder, and this diode will receive a voltage signal that contains both a DC and an AC component. The DC component performs the tuning by setting the phase of the arm in which it resides to be equal to or different by a constant offset to the other arm. The AC component provides perturbation of the index of refraction corresponding to optical modulation at the output of the modulator.

As illustrated in FIG. 1, conventionally a single diode 1 has been used to perform both the tuning and modulation functions. This requires combining the DC tuning components, such as low-speed tuning circuit 2, with the AC modulation components, such as high-speed data source 3, using an integrated bias-tee element.

However, given the inherent tradeoffs discussed previously in selecting the diode operation region, using a reverse-biased diode that has been optimized for high-speed modulation to perform the low-speed tuning operation in addition to the high-speed modulation may result in poor efficiency in terms of power, area, or both.

SUMMARY OF THE INVENTION

In view of the foregoing, and other, exemplary problems, drawbacks, and disadvantages of the conventional systems, it is an exemplary feature of the present invention to provide a photonic modulator including a diode optimized for power, area or a combination of the two to perform the tuning function and a diode optimized for speed to perform the modulation function.

An exemplary aspect of the invention is embodied as an amplitude modulator including a forward-biased diode optimized for power and area to perform a tuning function, and a reverse-biased diode optimized for speed to perform a modulation function.

Another exemplary aspect of the invention is embodied as an amplitude modulator including a first arm optimized for power and area to perform a tuning function, and a second arm optimized for speed to perform a modulation function.

An exemplary method of photonic modulating includes passing a signal through a photonic modulator, the modulator including a forward-biased diode and a reverse-biased diode, applying a low-speed tuning signal to the forward-biased diode, and applying a high-speed data source to the reverse-biased diode.

The above exemplary embodiments of the invention may provide a modulator with improved space, power efficiency and performance characteristics.

BRIEF DESCRIPTION OF THE DRAWINGS

The foregoing and other purposes, aspects and advantages will be better understood from the following detailed description of exemplary embodiments of the invention with reference to the drawings, in which.

DETAILED DESCRIPTION OF EXEMPLARY EMBODIMENTS OF THE INVENTION

Figure 1:
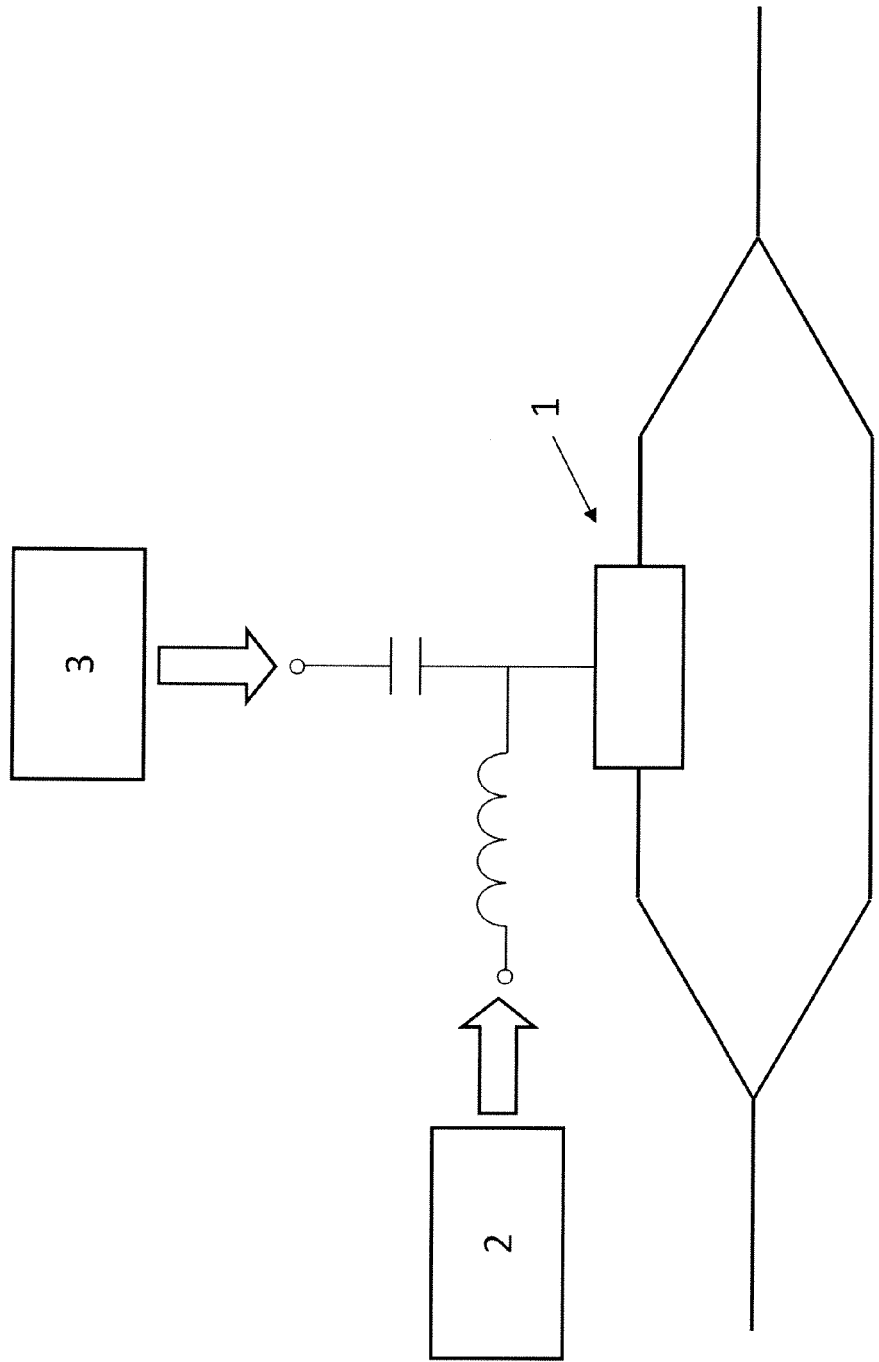
FIG. 1 illustrates a conventional photonic modulator.

Referring now to the drawings, and more particularly to FIGS. 2-5, there are shown exemplary embodiments of the method and structures according to the present invention.

Exemplary embodiments of the invention may be applied to both interferometric- and resonant-based photonic modulator devices using vertical- or horizontal junction diodes.

Figure 2:
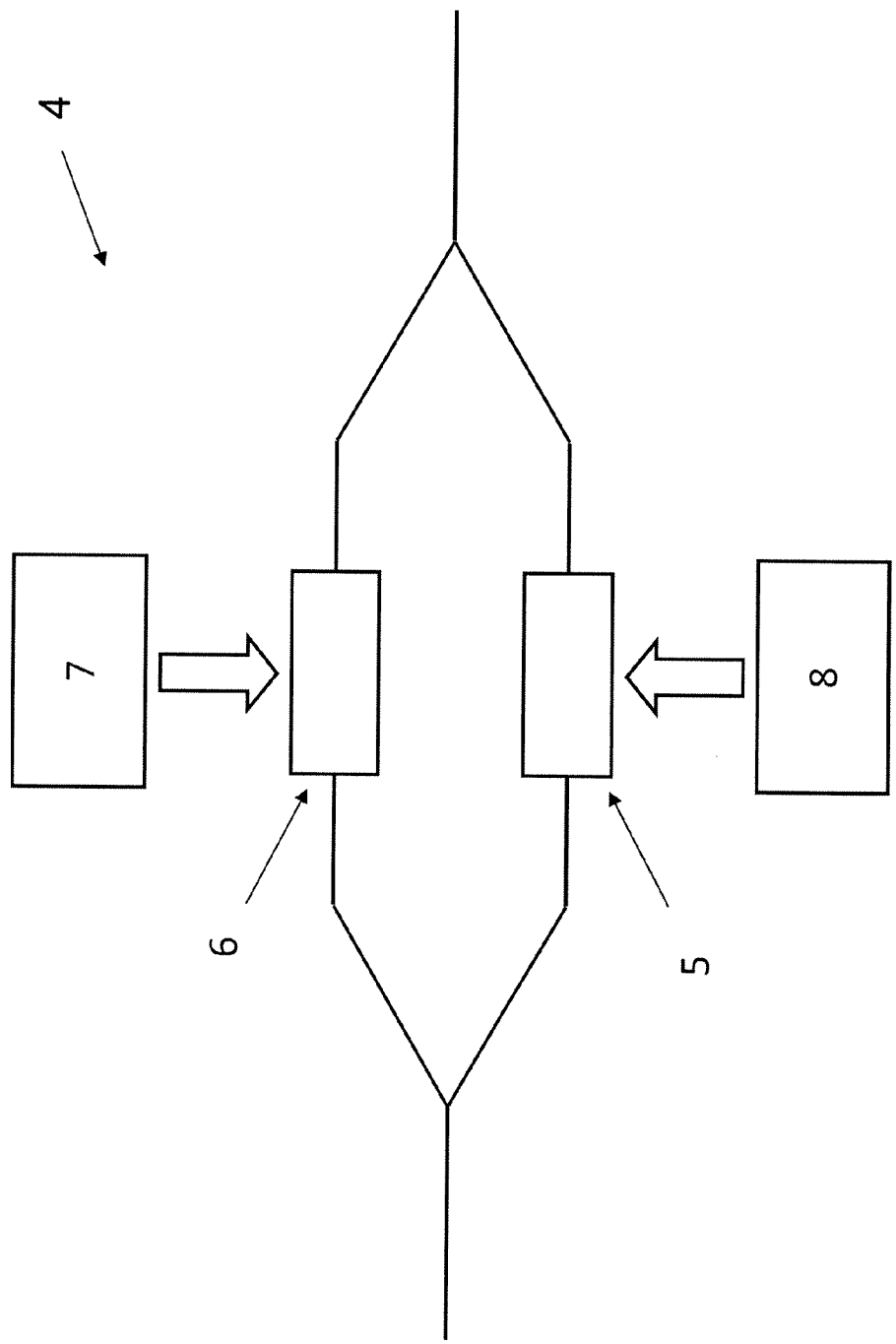
FIG. 2 illustrates an exemplary modulator including a forward-biased diode optimized for power and area to perform the tuning function and a reverse-biased diode optimized for speed to perform the modulation function.

As illustrated in FIG. 2, an exemplary embodiment of the invention includes, within the same modulator 4, a forward-biased diode 5 optimized for power, area, or a combination of the two to perform the tuning function and a reverse-biased diode 6, which excels at speed performance, to perform the modulation function. In the embodiment of FIG. 2, both AC modulation signals 7 and DC tuning signals 8 may be provided to the photonic modulator 4 by directing the AC modulation signals 7 to the reverse-biased diode 6 and directing the DC tuning signals 8 to the forward-biased diode 5. Since the reverse-biased diode may be less power and area efficient than the forward-biased diode in providing a given optical phase shift, the exemplary modulator can be more efficient in power, area, or both because it generates the portion of the necessary phase shift that is not required to operate at high speeds using a more efficient forward-biased diode.

Further, the exemplary modulator may not require electrically combining a DC signal with the AC modulation signal since the tuning is performed in a separate diode. This feature significantly reduces the complexity of the design required to direct the AC modulation signal from the data source to the reverse-biased diode.

In an exemplary embodiment of the invention a Mach-Zehnder interferometer (MZI) is constructed from photonic waveguides in an integrated photonic platform such as silicon, silicon-on-insulator, or indium-phosphide. The waveguides may be ridge waveguides, channel waveguides, strip waveguides, or various other types of waveguides.

Figure 3:
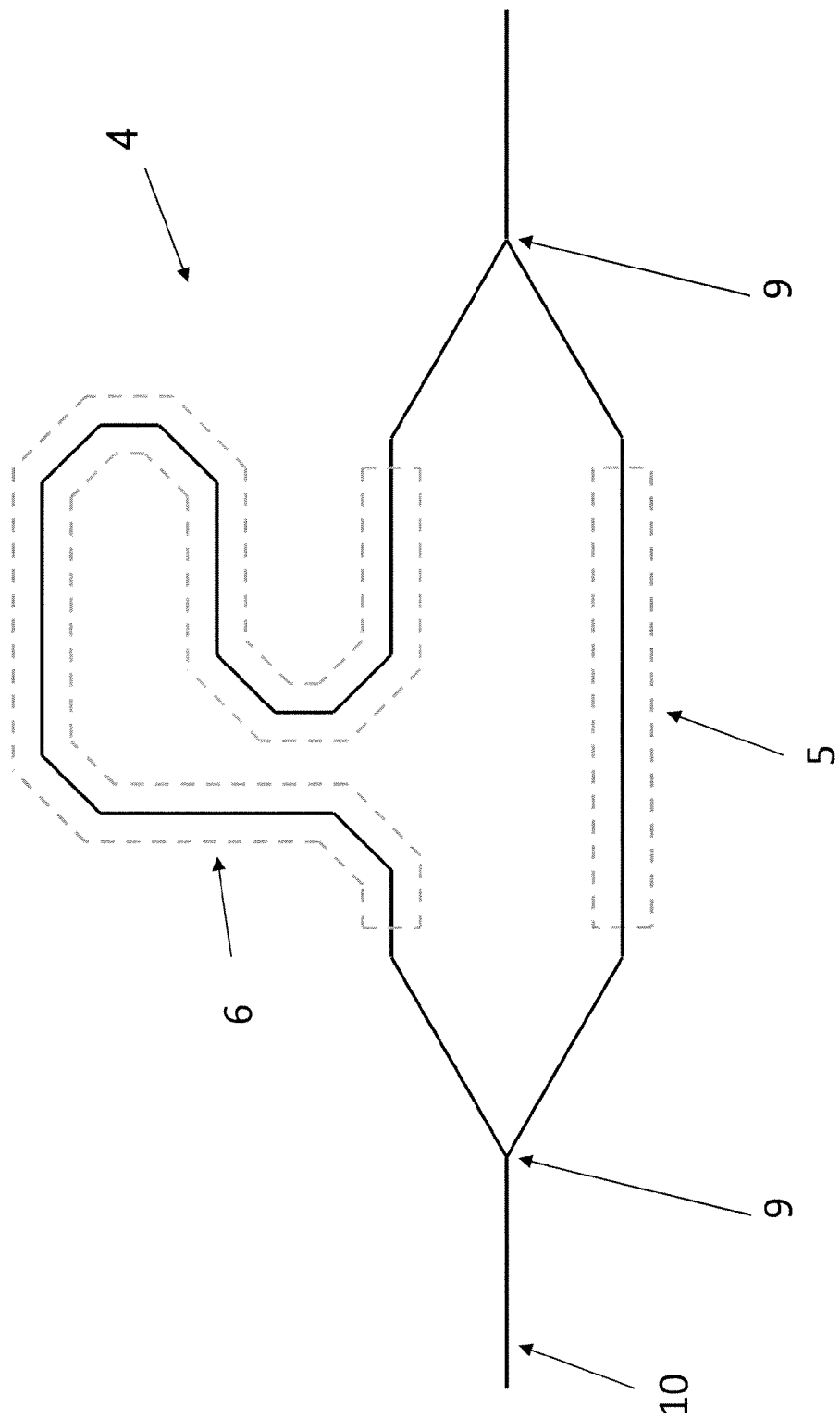
FIG. 3 illustrates an exemplary embodiment using a Mach-Zehnder interferometer modulator.

FIG. 3 illustrates an exemplary embodiment of the present invention using a MZI modulator. As can readily be seen, in the exemplary embodiment, the two arms of the MZI may differ in length substantially. In one arm of an exemplary MZI, most typically the longer arm, a reverse-biased p-n or p-i-n diode 6 is fabricated. For a p-n diode, the diode's junction overlaps with the optical waveguide 10. Likewise, for a p-i-n diode, the diode's intrinsic region overlaps the waveguide 10. Various diode geometries may be used, including but not limited to horizontal junction p-n diodes and vertical-junction p-i-n diodes using a shallow-etched implant region.

In the second arm of the MZI, most typically the shorter arm, a forward-biased p-n or p-i-n diode 5 is fabricated. All of the possible geometrical and electronic variations previously described for the reverse-biased diode 6, also apply to the forward-biased diode 5.

In an exemplary embodiment of the invention, the contacts to the reverse-biased diode are connected to the output of a high-speed diode driver 7 (FIG. 2) which is supplied with the data pattern with which the light is to be modulated. The contacts to the forward-biased diode 5 are connected to either an open- or closed-loop control system 8 (FIG. 2) that provides an optimized DC bias to tune the modulator. The high-speed diode driver 7 and the control system 8 may be monolithically integrated on the same chip with the photonic modulator 4 with contacts provided through metal wiring levels, or they may be located on a separate chip or chips with contacts provided through standard packaging procedures such as wire-bonding or flip-chip bonding.

In addition, the splitting and combining functionalities required within the MZI can be implemented using Y-junctions or directional couplers, illustrated in FIG. 3 as element 9.

Furthermore, the splitting ratio can be modified by tuning the design of the photonic waveguides 10 so that the optical powers within the two arms just before the combiner 9 are equal (or are of some other preferred ratio). In some exemplary embodiments this may be necessary since the optical losses of the forward- and reverse-biased diodes can differ.

Figure 4:
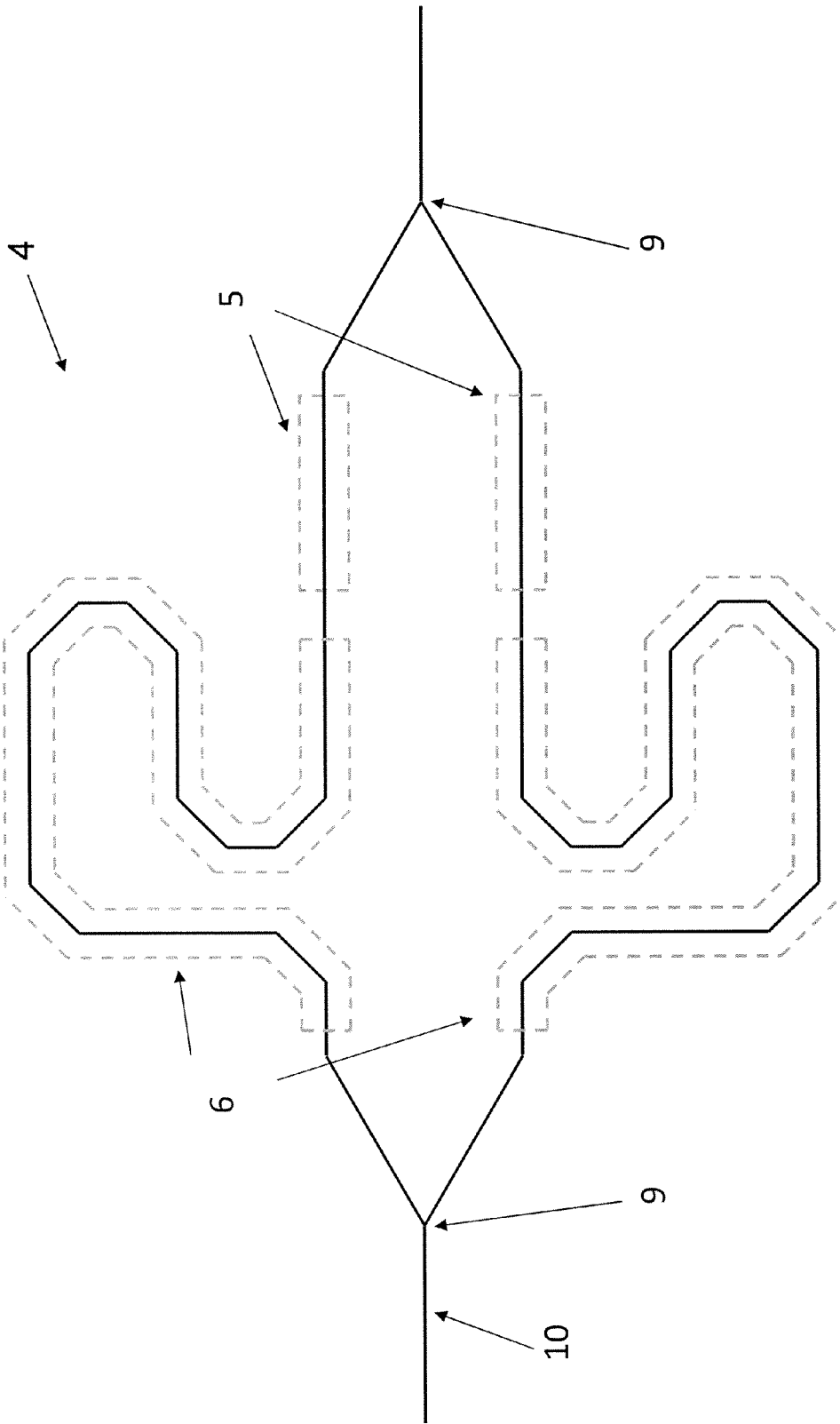
FIG. 4 illustrates an exemplary push-pull modulator.

FIG. 4, illustrates an exemplary push-pull embodiment using a MZI modulator. In this exemplary embodiment an MZI is fabricated in a photonic platform with both a reverse-biased diode 6 and a forward-biased diode 5 fabricated in each arm. The reverse-biased diodes 6 are operated in push-pull configuration, where differential outputs from the high-speed diode driver are connected to the two diodes so that instead of an optical phase shift of pi radians being required in one arm of the MZI, rather an optical phase shift of pi/2 radians is applied onto both arms with opposing sign. An exemplary control system may operate either of the two forward-biased phase shifters to bias the modulator appropriately, so that instead of providing 0 to 2*pi phase adjustment in one arm, the control system may provide 0 to pi phase adjustment in either arm.

Figure 5:
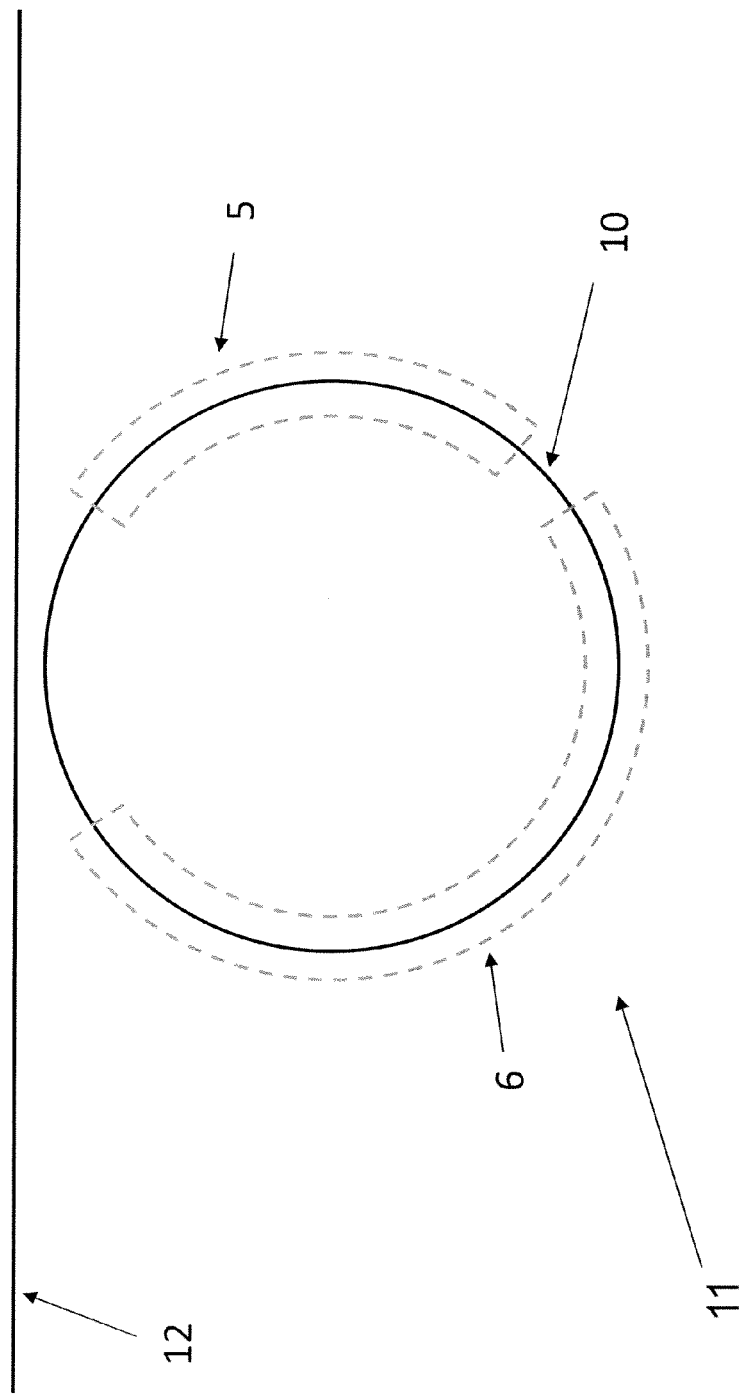
FIG. 5 illustrates an exemplary resonator including a reverse-biased diode and a forward-biased diode.

FIG. 5 illustrates another exemplary embodiment of the invention. In the embodiment of FIG. 5, a resonator 11 is fabricated in a photonic platform with both a reverse-biased diode 6 and a forward-biased diode 5 fabricated within the resonator 11. The resonator 11 may be implemented using various waveguide geometries, including but not limited to ring resonators, race-track resonators, and Fabry-Perot resonators.

As with the MZI modulator, the reverse-biased diode 6 within the resonator 11 is connected to a high-speed diode driver and the forward-biased diode within the resonator 11 is connected to an open- or closed-loop control system. Additionally, an optical bus waveguide 12 may be provided.

While the invention has been described in terms of exemplary embodiments, those skilled in the art will recognize that the invention can be practiced with modification within the spirit and scope of the appended claims.

Further, it is noted that, Applicants' intent is to encompass equivalents of all claim elements, even if amended later during prosecution.

The invention claimed is:

1. A modulator comprising:
   a forward-biased diode configured to perform a tuning function; and
   a reverse-biased diode configured to perform a modulation function,
   wherein at least one of the forward-biased diode and the reverse-biased diode comprises a p-n diode.

2. The modulator according to claim 1, further comprising:
   a first arm including the reverse-biased diode; and
   a second arm including the forward-biased diode.

3. The modulator according to claim 2, wherein the reverse-biased diode comprises at least one of a reverse-biased p-n diode and a reverse-biased p-i-n diode, and wherein the forward-biased diode comprises at least one of a forward-biased p-n diode and a forward-biased p-i-n diode.

4. The modulator according to claim 3, wherein a junction of at least one of the reverse-biased p-n diode and the forward-biased p-n diode overlaps with a waveguide.

5. The modulator according to claim 3, wherein an intrinsic region of at least one of the reverse-biased p-i-n diode and the forward-biased p-i-n diode overlaps with a waveguide.

6. The modulator according to claim 2, wherein the first arm and the second arm comprise photonic waveguides in an integrated photonic platform comprising at least one of silicon, silicon-on-insulator, and indium-phosphide.

7. The modulator according to claim 6, wherein the waveguides include at least one of ridge waveguides, channel waveguides and strip waveguides.

8. The modulator according to claim 2, wherein the first arm comprises a length greater than a length of the second arm.

9. The modulator according to claim 2, wherein the first arm includes a forward-biased diode and the second arm includes a reversed-biased diode.

10. The modulator according to claim 2, wherein the first arm and the second arm are integrated in a photonic platform.

11. The modulator according to claim 1, wherein both the reverse-biased diode and the forward-biased diode are disposed within a resonator.

12. The modulator according to claim 1, wherein the forward-biased diode is optimized for power and area to perform the tuning function, and
wherein the reverse-biased diode is optimized for speed to perform the modulation function.

13. The modulator according to claim 2, wherein the first arm and second arm comprise photonic waveguides integrated in a silicon platform.

14. The modulator according to claim 1, wherein the reverse-biased diode is connected to a high-speed diode driver and the forward-biased diode is connected to at least one of an open-loop control system and a closed-loop control system.

15. The modulator according to claim 2, wherein the first arm and second arm comprise photonic waveguides integrated in a silicon platform, and
wherein the reverse-biased diode is connected to a high-speed diode driver and the forward-biased diode is connected to at least one of an open-loop control system and a closed-loop control system, such that at least one of the diode driver and control system are integrated in the silicon platform.

16. The modulator according to claim 1, further comprising a first arm and a second arm,
wherein the first arm includes the forward-biased diode and the reverse-biased diode.

17. The modulator according to claim 1, further comprising:
an optical input port;
an optical output port;
an input terminal to apply voltage to the forward-biased diode; and
an input terminal to apply voltage to the reverse-biased diode.

18. A modulator comprising:
a first arm configured to perform a tuning function; and
a second arm configured to perform a modulation function,
wherein at least one of the first arm and the second arm comprises a p-n diode.

19. The modulator according to claim 18, wherein the first arm includes a forward-biased diode; and
wherein the second arm includes a reverse-biased diode.

20. A method of photonic modulating comprising:
passing a signal through a modulator, the modulator including a forward-biased diode and a reverse-biased diode, at least one of the forward-biased diode and the reverse-biased diode comprises a p-n diode;
applying a low-speed tuning signal to the forward-biased diode; and
applying a high-speed data source to the reverse-biased diode.

* * * * *